United States Patent Office 3,558,457
Patented Jan. 26, 1971

---

3,558,457
HYDROXYSULFONATE PRODUCTION
Clarence L. Furrow, Bartlesville, Okla., assignor to Phillips Petroleum Company, a corporation of Delaware
No Drawing. Filed May 22, 1967, Ser. No. 640,376
Int. Cl. B01j 1/10; C07c 143/10
U.S. Cl. 204—158     7 Claims

ABSTRACT OF THE DISCLOSURE

Improved yields of hydroxysulfonates are obtained by contacting an epoxide and a bisulfite in the presence of a chemical free radical initiator or electromagnetic radiation of 1000–8000 angstroms. The hydroxysulfonates produced are desirable detergent surfactants.

BACKGROUND OF THE INVENTION

This invention relates to the production of hydroxysulfonates. In another aspect, this invention relates to an improved process for the production of increased yields of hydroxysulfonates by the reaction of an epoxide with a bisulfite in the presence of a free radical initiator.

Hydrocarbonsulfonates are well known as detergent surfactants. Conventional alkylbenzenesulfonates, while possessing good surfactant properties, often suffer from poor biodegradability. On the other hand, alkanesulfonates, have, in general, good biodegradability. As Weil et al. [J. Oil Chemists Soc., 40, (10) 538–41 (1963)] disclose, alpha-hydroxyalkanesulfonates are desirable detergent surfactants. Such hydroxysulfonates are also valuable intermediates that can be converted to various other useful compounds, as is well known to the art.

In accordance with the present invention, an improved process for producing hydroxysulfonates from epoxides and bisulfites has now been found. The process of the invention, which markedly increases yields of hydroxysulfonates, constitutes a new and improved result and is definitely an advance in the art.

Accordingly, it is an object of this invention to provide a process for the production of hydroxysulfonates.

Another object of this invention is to provide a process for the production of increased yields of hydroxysulfonates from epoxides and bisulfites.

Another object of this invention is to provide an improved process utilizing free radical initiators and electromagnetic radiation for the promotion of reactions resulting in the production of hydroxysulfonates.

Other aspects, objects and the several advantages of this invention will be readily apparent to one skilled in the art upon a reading of this disclosure and the appended claims.

SUMMARY OF THE INVENTION

In accordance with the present invention, hydroxysulfonates in increased yields are prepared by the reaction of an epoxide and a bisulfite salt in the presence of a free radical initiator such as organic peroxides and electromagnetic radiation.

It has been further found, according to the invention, that additional increases in yields of hydroxysulfonates can be realized by adjusting the pH of the reaction defined above so as to carry out the reaction in the pH range of 5–8. This can be accomplished by the addition of an alkaline compound such as sodium hydroxide to the reaction.

DESCRIPTION OF PREFERRED EMBODIMENTS

The epoxides particularly dealt with herein are the epoxyalkanes in which the epoxy oxygen atom is bonded to adjacent carbon atoms of a carbon chain of the molecule, i.e., olefin oxides, and derivatives of such epoxyalkanes in which the only substituent that is chemically reactive under the reaction conditions employed is the epoxy group, for example, epoxyalkanes substituted with halo or alkoxyl radicals.

The epoxides that can be employed in this invention are represented by the formula

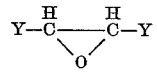

wherein Y is $CH_2$—R or H, not more than one Y is H, and R is an alkyl group or alkyl group wherein 1–4 hydrogen atoms have been replaced by halo groups and/or alkoxy groups that contain in the range of about 2 to about 40 carbon atoms per R group, provided that each molecule contains no more than about 60 carbon atoms.

Representative examples of such epoxides are: 1,2-epoxydodecane, 1,2-epoxybutane, 3,4-epoxytetracontane, 8,9-epoxy-14-heptylhenitricontane, 1,2-epoxyoctadecane, 1,2-epoxydecane, 1,2-epoxytridecane, 1,2-epoxytetradecane, 3,4-epoxyheptadecane, 24,25-epoxyhexacontane, 1,2-epoxy-4-ethyl-6-methylpentadecane, 2,3-epoxy-6-ethyl-8-isopropyleicosane, 3,4-epoxyoctadecane, 1,2-epoxy-4-chlorobutane, 1,2-epoxy-5-ethoxyhexane, 3,4-epoxy-5-chloro-6-bromo-8-methoxyhenitricontane, and the like.

It is within the scope of this invention that mixtures of such compounds can also be employed. These epoxides can readily be obtained from commercial sources or can be made by oxidizing hydrocarbons or other organic compounds by methods which are well known to the art.

The bisulfites employed according to the invention can include any conventional bisulfite salt. Bisulfites normally employed in the process of the invention have a formula $MHSO_3$ wherein M is selected from the group consisting of sodium, potassium, lithium, rubidium, cesium, pyridinium, and ammonium. Representative examples of bisulfites that can be employed include: sodium bisulfite, potassium bisulfite, ammonium bisulfite, pyridinium bisulfite, and the like. Normally, sodium bisulfite or potassium bisulfite, or mixtures of such, are preferred because of economics.

The amount of bisulfite employed during the reaction according to the invention should be sufficient to provide at least about one bisulfite group for each epoxy moiety of the epoxide charged. Other ratios can be employed within the range of about 0.1 to about 100 equivalents of bisulfite per equivalent of epoxide, or more. Preferably, sufficient bisulfite to provide about three bisulfite groups per two epoxy moieties is employed.

The free radical initiators employed in this invention can include any free radical initiator known to the art that does not deleteriously affect the conversion process of this invention. Examples of such initiators include: t-butyl peracetate, azobisisobutyramidine hydrochloride, di-t-butyl peroxide, potassium persulfate, t-butyl perbenzoate, t-butyl-t-amyl peroxide, 2,2-bis(t-butylperoxy)propane, 2,2-bis(t-amylperoxy)butane, t-butyl perlaurate, 2-t-butylperoxy-2-methylhexane, 2,2-bis(t-butylperoxy)butane, di-t-amyl peroxide, 3-benzoylperoxy-2-methylheptane, t-amyl perbenzoate, 2,2-bis(2-methylheptylperoxy)butane, sodium persulfate, and the like. The organic peroxides are presently preferred as free radical initiators.

The amount of chemical free radical initiator to be employed will, of course, vary with other variables for optimum results. In general, however, it is preferred to employ between about 0.001 and 0.5 mole of chemical free radical initiator per mole of epoxide.

It is also within the scope of this invention to employ electromagnetic radiation as an initiator in the process of this invention. Electromagnetic radiation that can be employed will have a wave length generally ranging from about 1,000 to 8,000 angstroms, thus including ultraviolet radiation and visible light, and is preferably in the range of 2,000 to 4,000 angstroms. The radiation dose absorbed by the epoxide-bisulfite mixture will range, generally, from 0.001 to 1.0 einstein, preferably from 0.01 to 0.5 einstein. Any suitable source of these forms of electromagnetic radiation can be employed, including such sources as mercury vapor lamps, photo lamps, sun lamps, sunlight, and the like.

The reaction is ordinarily conducted in the presence of a diluent which can include water, polar organic compounds, as well as hydrocarbon. Representative examples of suitable diluents that can be employed include: water, ethanol, methanol, isopropanol, n-propanol, isobutanol, xylene, toluene, pyridine, 3-methylpyridine, 6-aminohexanol, dioxane, acetone, methyl ethyl ketone, and the like. One skilled in the art can readily determine which particular diluents or mixtures thereof are most suitable for the particular reactants, free radical initiator, and reaction conditions employed.

The reaction of the epoxide and bisulfite is conducted at a temperature ranging from about 5° C. to about 150° C. Temperatures in the range 90° C. and 120° C. are preferred. The pressure will generally be autogenous and will range from about atmospheric to about 500 p.s.i. depending upon the reaction temperature solvent employed, and the like. The time of reaction will generally range from a few minutes to 50 hours, or longer. However, sufficient time of reaction should be employed to effect the degree of conversion desired and optimums can readily be determined for each particular set of variables by one skilled in the art.

The reaction can be conducted either batchwise or continuous, but it is presently preferred batchwise. The constituents in the reaction mixture can be introduced independently into the reaction zone or the various constituents can be pre-mixed and introduced into the reaction zone as a mixture or mixtures.

5 and 8. This can be readily accomplished by the addition of an alkaline material such as an alkali metal hydroxide, an ammonium hydroxide, a pyridine, etc., in an amount sufficient to maintain the bisulfite solution at a pH above 5 and below about 8. In actual operation, quantities of bisulfite and alkaline material can be varied within ranges which preserve the above-specified pH range. If desired, bisulfite can be introduced into the reaction zone in amounts as specified above to be reacted with the epoxide and an amount of alkaline material added which establishes the desired pH.

After the reaction is complete, the reaction mixture can be subjected to a separation step wherein materials such as water, polar organic solvent or hydrocarbon are separated from the product hydroxysulfonate.

EXAMPLE I

As is summarized by the following table, runs were made wherein 1,2-epoxydodecane was reacted with sodium bisulfite. To a stirred reactor of each of runs 1, 2, and 3, were charged 31.2 g. (0.3 mole) of sodium bisulfite and 60 ml. of water. The reactor contents of run 1 were adjusted to pH 7 by the addition of 50 weight percent NaOH solution. To the reactor of each run were then charged 36.8 g. (0.2 mole) of 1,2-epoxydodecane and 40 ml. of n-propanol. The temperature of the reactor contents of each run was brought to 90° C. To each of the reactors of runs 1 and 2 was charged 0.45 g. of a solution comprised of 75 weight percent t-butylperacetate and 25 weight percent benzene. The reactors were maintained at 90° C. for 7 hours, they were cooled, and the yield of sodium alpha-hydroxydodecanesulfonate was determined for each run by titration with cetyltrimethylammonium bromide. Yield was calculated on the molar basis of 1,2-epoxydodecane that was converted to sulfonate $$\left[\frac{\text{moles of sulfonate recovered (100)}}{\text{moles of 1,2-epoxydodecane charged}}\right]$$

Data are presented by the following table:

TABLE

| | Conditions | Yield, g. | Percent yield |
|---|---|---|---|
| Run 1 | Neutralized plus free radical initiator | 10.95 | 19.0 |
| Run 2 | Free radical initiator | 5.84 | 11.2 |
| Run 3 | Control (no initiator) | 0.379 | 0.658 |

Examples of hydroxysulfonates which can be prepared in accordance with this invention inlude:

sodium alpha-hydroxydodecanesulfonate,
sodium alpha-hydroxybutanesulfonate,
potassium alpha-hydroxydecanesulfonate,
ammonium alpha-hydroxyoctadecanesulfonate,
lithium alpha-hydroxy-4-ethyl-6-methylpentadecanesulfonate,
pyridinium alpha-hydroxy-4-ethylheptadecanesulfonate,
sodium 24-hydroxyhexacontane-25-sulfonate,
potassium 8-hydroxy-14-heptylhenitricontane-9-sulfonate,
rubidium 3-hydroxy-6-ethyl-8-isopropyleicosane-4-sulfonate,
sodium alpha-hydroxy-8-chlorododecanesulfonate,
potassium 2-hydroxy-6-ethoxy-8-bromo-3-octadecanesulfonate,
sodium 2-hydroxy-4-butoxy-3-hexanesulfonate,
and the like.

The hydroxysulfonates prepared by the process of this invention have wide utility, particularly in the detergent and wetting agent field. For example, the reaction of 1,2-epoxydodecane with sodium bisulfite, according to the process of this invention, produces sodium alpha-hydroxydodecane sulfonate, an excellent detergent material.

As indicated previously, greater increases in yield of hydroxysulfonate can be realized by maintaining the pH of the reaction mixture of the invention between about These data clearly demonstrate, then, that the process of this invention greatly improves the yield of valuable alpha-hydroxydrocarbonsulfonates from a bisulfite and an epoxide.

EXAMPLE II

As in Example I, to a stirred reactor were charged 15.6 g. (0.15 mole) of sodium bisulfite, 200 ml. of water, 200 ml. of n-propanol, and 18.4 g. (0.1 mole) of 1,2-epoxydodecane. The reactor contents were warmed to about 32° C. and irradiated with ultraviolet radiation at 2537° A in a Rayonet Photochemical Reactor, Model RPR-100 (quartz reaction flask), for 7 hours with the temperature held at about 32° C. The yield of product, determined as before, was found to be 1.27 g. or 4.41 percent.

This example demonstrates that electromagnetic radiation is also an effective means for producing free radicals and promoting the process of this invention.

I claim:
1. A process for the production of hydroxysulfonates comprising contacting:
   (a) an epoxide having the formula

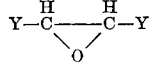

wherein Y is $CH_2$—R or H, not more than one Y is H, and R is an alkyl group containing from 2 to about 40 carbon atoms per R group, with the further proviso that each epoxide molecule contains no more than 60 carbon atoms, and (b) a bisulfite salt having the formula $MHSO_3$ wherein M is selected from the group consisting of sodium, potassium, lithium, rubidium, cesium, pyridinium, and ammonium, in the presence of (c) a chemical free radical initiator or electromagnetic radiation having a wave length in the range of 2000–4000 angstroms.

2. A process according to claim 1 wherein said chemical free radical initiator is t-butyl peracetate, azobisisobutyramidine hydrochloride, di-t-butyl peroxide, potassium persulfate, t-butyl perbenzoate, t-butyl-t-amyl peroxide, 2,2-bis(t-butylperoxy)propane, 2,2-bis(t-amylperoxy)butane, t-butyl perlaurate, 2-t-butylperoxy-2-methylhexane, 2,2-bis(t-butylperoxy)butane, di-t-amyl peroxide, 3-benzoylperoxy-2-methylheptane, t-amyl perbenzoate, 2,2-bis(2-methylheptylperoxy)butane, or sodium persulfate.

3. A process according to claim 1 wherein the pH of the reaction is maintained within the range 5–8 by the addition of an alkaline material to the reaction.

4. A process according to claim 1 wherein the temperature maintained is in the range 5–150° C., and the ratio of (b) to (a) is 0.1 to about 100 equivalents of bisulfite perequivalent of epoxide, the amount of chemical free radical initiator present ranging from 0.001 to 0.5 mole per mole of epoxide, and wherein said contacting is carried out in a reaction diluent selected from water, polar organic compounds and hydrocarbons.

5. A process according to claim 4 wherein (a) is 1,2-epoxydodecane, (b) is sodium bisulfite, and (c) is ultraviolet radiation.

6. A process according to claim 4 wherein (a) is 1,2-epoxydodecane, (b) is sodium bisulfite, and (c) is t-butyl peracetate.

7. A process according to claim 6 wherein sodium hydroxide is added to the reaction to maintain a pH of the reaction mixture of about 7.

References Cited

UNITED STATES PATENTS

| 3,342,714 | 9/1967 | Furrow et al. | 204—158 |
| 3,093,682 | 6/1963 | Sullivan | 260—513 |
| 3,102,893 | 9/1963 | Gaertner | 260—513 |
| 3,450,749 | 6/1969 | Furrow | 260—503 |

OTHER REFERENCES

Malinovskii: Epoxides and Their Derivatives (1965), page 167.

HOWARD S. WILLIAMS, Primary Examiner

U.S. Cl. X.R.

260—513